(12) United States Patent
Sato et al.

(10) Patent No.: US 9,378,552 B2
(45) Date of Patent: Jun. 28, 2016

(54) IMAGE PROCESSING APPARATUS AND IMAGE PROCESSING METHOD

(71) Applicant: Panasonic Corporation, Osaka (JP)

(72) Inventors: Yoshikuni Sato, Fukui (JP); Hideto Motomura, Kyoto (JP); Kazuki Kozuka, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 275 days.

(21) Appl. No.: 14/108,439

(22) Filed: Dec. 17, 2013

(65) Prior Publication Data

US 2014/0105475 A1 Apr. 17, 2014

Related U.S. Application Data

(63) Continuation of application No. PCT/JP2013/002988, filed on May 9, 2013.

(30) Foreign Application Priority Data

May 24, 2012 (JP) ................................. 2012-119079

(51) Int. Cl.
  *G06K 9/00* (2006.01)
  *G06T 7/00* (2006.01)
  (Continued)

(52) U.S. Cl.
  CPC ................ *G06T 7/0014* (2013.01); *G06K 9/52* (2013.01); *G06K 9/6218* (2013.01);
  (Continued)

(58) Field of Classification Search
  None
  See application file for complete search history.

(56) References Cited

U.S. PATENT DOCUMENTS

| 7,616,789 B2 | 11/2009 | Oosawa |
| 2003/0210813 A1 | 11/2003 | Oosawa |
| 2007/0189594 A1 | 8/2007 | Oosawa |

FOREIGN PATENT DOCUMENTS

JP 2004-41694 2/2004

OTHER PUBLICATIONS

Felzenszwalb, Pedro F., et al. "Object detection with discriminatively trained part-based models." Pattern Analysis and Machine Intelligence, IEEE Transactions on 32.9 (2010): 1627-1645.*

(Continued)

*Primary Examiner* — Stephen R Koziol
*Assistant Examiner* — Raphael Schwartz
(74) *Attorney, Agent, or Firm* — Wenderoth, Lind & Ponack, L.L.P.

(57) ABSTRACT

An image processing apparatus including: an examination image obtaining unit obtaining an examination image of an examination subject; a shift-invariant feature quantity calculating unit calculating, for each pixel, a shift-invariant feature quantity represented by predetermined base vectors, from the examination image obtained by the examination image obtaining unit; a selecting unit selecting, on the examination image, a pixel having a matching degree lower than or equal to a predetermined threshold, between (i) a relative positional relationship of classes in normal images each of which does not include a lesion site and (ii) a relative positional relationship of the classes to which shift-invariant feature quantities respectively belong in the examination image, the classes being obtained by clustering the shift-invariant feature quantities calculated from pixels included in the normal images; and represented by the predetermined base vectors; and an output unit outputting a result of the selection performed by the selecting unit.

10 Claims, 14 Drawing Sheets

(51) Int. Cl.
*G06K 9/52* (2006.01)
*G06K 9/62* (2006.01)

(52) U.S. Cl.
CPC .... *G06T 7/0044* (2013.01); *G06T 2207/20064* (2013.01); *G06T 2207/20076* (2013.01); *G06T 2207/30096* (2013.01)

(56) References Cited

OTHER PUBLICATIONS

Zhang, Wei, et al. "An improved shift- invariant artificial neural network for computerized detection of clustered microcalcifications in digital mammograms." Medical Physics 23.4 (1996): 595-601.*
K-means Clustering, Wikipedia, the free encyclopedia, Jan. 27, 2012.*
Shlens, John, A Tutorial on Principal Component Analysis, Mar. 25, 2003.*
Amer, Mennatallah, and Slim Abdennadher. "Comparison of unsupervised anomaly detection techniques." Bachelor's Thesis (2011).*
International Search Report issued Aug. 13, 2013 in International (PCT) Application No. PCT/JP2013/002988.
Bram van Ginneken et al., Automatic detection of abnormalities in chest radiographs using local texture analysis, IEEE Transactions on Medical Imaging, Feb. 2002, vol. 21, No. 2, pp. 139-149.
Hisanaga Fujiwara et al., Textile Surface Inspection by Using Translation Invariant Wavelet Shrinkage, IEEJ Trans. 1A, vol. 126, No. 1, Jan. 2006, pp. 25-34 (Partial English translation).
Shinji Umeyama et al., Rotation invariant features based on higher-order autocorrelations, Electrotechnical Laboratory, Sep. 1992, pp. 323-324 (Partial English translation).

* cited by examiner

FIG. 7

| Image No. | Image coordinate | | Normal image feature quantity vector | | | |
|---|---|---|---|---|---|---|
| | x | y | F1 | F2 | ... | Fn |
| 1 | 1 | 1 | 0.5 | 1.5 | ... | -0.5 |
| | 2 | 1 | -0.2 | 2.1 | ... | -0.1 |
| | ... | ... | ... | ... | ... | ... |
| | W | H | -0.1 | 1.2 | ... | 0.2 |
| 2 | 1 | 1 | 0.8 | 0.2 | ... | -0.5 |
| | 2 | 1 | 0.6 | 0.5 | ... | 0.4 |
| | ... | ... | ... | ... | ... | ... |
| | W | H | -0.2 | 1.8 | ... | 0.1 |
| ... | ... | ... | ... | ... | ... | ... |
| Q | ... | ... | ... | ... | ... | ... |

FIG. 8

| Image No. | Image coordinate | | Class number |
|---|---|---|---|
| | x | y | |
| 1 | 1 | 1 | 0 |
| | 2 | 1 | 8 |
| | ... | ... | ... |
| | W | H | 19 |
| 2 | 1 | 1 | 8 |
| | 2 | 1 | 15 |
| | ... | ... | ... |
| | W | H | 7 |
| ... | ... | ... | ... |
| Q | ... | ... | ... |

FIG. 9

| Class number | Center vector | | | |
|---|---|---|---|---|
| | F1 | F2 | ... | Fn |
| 1 | 0.5 | 0.2 | ... | -0.2 |
| 2 | 0.9 | 1.5 | ... | 0.8 |
| 3 | -2.1 | -1.1 | ... | 0.2 |
| ... | ... | ... | ... | ... |
| C | 0.5 | 2.5 | ... | 1.2 |

FIG. 12

| Focus pixel class number | Right pixel class number | | | | |
|---|---|---|---|---|---|
| | 1 | 2 | 3 | ... | C |
| 1 | 0.80 | 0.09 | 0.02 | ... | 0.05 |
| 2 | 0.00 | 0.50 | 0.21 | ... | 0.00 |
| 3 | 0.06 | 0.00 | 0.60 | ... | 0.00 |
| ... | ... | ... | ... | ... | ... |
| C | 0.03 | 0.10 | 0.08 | ... | 0.70 |

FIG. 13

|  | | Right class number | | | | |
|---|---|---|---|---|---|---|
| Focus class number | | 1 | 2 | 3 | ... | C |
| | 1 |  | 0.09 | 0.02 | ... | 0.05 |
| | 2 | 0.06 | 0.00 | 0.21 | ... | 0.00 |
| | 3 | | | | ... | 0.00 |
| | ... | ... | ... | ... | | ... |
| | C | 0.03 | 0.10 | 0.08 | ... | |

FIG. 15

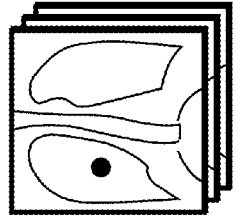

Medical image on which lesion site is supervised

| Lesion image | Coordinate (x, y) | Normal portion (0) / Lesion site (1) | Image feature quantity vector | Base representation | Distance from nearest normal structure local feature vector |
|---|---|---|---|---|---|
| 1 | (0, 0) | 0 | fn, 0 | an, 0 | 0.6 |
|  | (1, 0) | 0 | fn, 1 | an, 1 | 0.4 |
|  | ... | ... | ... | ... | ... |
|  | (x, y) | 1 | fd, 0 | ad, 0 | 1.4 |
|  | (x + 1, y) | 1 | fd, 1 | ad, 1 | 0.7 |
|  | (x + 2, y) | 1 | fd, 2 | ad, 2 | 1.5 |
|  | ... | ... | ... | ... | ... |
|  | (W, H) | 0 | fn, na | an, na | 0.2 |
| 2 | ... | ... | ... | ... | ... |

Determine threshold which can most effectively distinguish between normal portion and lesion site

IMAGE PROCESSING APPARATUS AND IMAGE PROCESSING METHOD

CROSS REFERENCE TO RELATED APPLICATIONS

This is a continuation application of PCT International Application No. PCT/JP2013/002988 filed on May 9, 2013, designating the United States of America, which is based on and claims priority of Japanese Patent Application No. 2012-119079 filed on May 24, 2012. The entire disclosures of the above-identified applications, including the specifications, drawings and claims are incorporated herein by reference in their entirety.

FIELD

Apparatuses and methods consistent with one or more exemplary embodiments of the present disclosure relate to an image processing apparatus and an image processing method for processing a medical image.

BACKGROUND

In recent years, there has been increase in the importance of computer-aided diagnosis (CAD) for supporting diagnosis by a doctor with the image analysis techniques using a computer. The most general function of the CAD is detection of a lesion site in an image.

When detecting a lesion using a computer, an examination image and a normal image are compared to find a difference. Calculation of a difference between two data items is a fundamental function in computer processing, and the computer processing excels at diagnostic imaging which detects a lesion site by comparing an examination image and a normal image which is a medical image of a normal structure.

However, position adjustment of the normal image and the examination image needs to be carried out for performing the difference calculation. Patent Literature (PTL) 1 discloses a method with which a landmark is set to each of the normal image and the examination image, position adjustment is carried out for the normal image and the examination image so as to match the landmarks, and a lesion site is detected based on the difference between the normal image and the examination image, thereby supporting diagnostic imaging.

CITATION LIST

Patent Literature

[PLT 1] Japanese Unexamined Patent Application Publication No. 2004-41694

SUMMARY

However, in PLT 1, there is no mentioning about a method of setting the landmark. Position adjustment can be done in various aspects according to the difference between setting methods of the landmark, variation in a setting position of the landmark, and so on, even with the same combination of the normal image and the examination image. For that reason, the lesion site is detected or not detected depending on the aspect of the position adjustment, leading to a problematic situation in which detecting of a lesion cannot be accurately performed.

One or more exemplary embodiments of the present disclosure provide an image processing apparatus capable of performing accurate lesion detection.

In one general aspect, the techniques disclosed here feature an image processing apparatus including: an examination image obtaining unit which obtains an examination image which is an image of an examination subject; a shift-invariant feature quantity calculating unit which calculates, for each pixel, a shift-invariant feature quantity which is represented by predetermined base vectors, from the examination image obtained by the examination image obtaining unit; a selecting unit which selects, on the examination image, a pixel having a matching degree lower than or equal to a predetermined threshold, between (i) a relative positional relationship of classes in a plurality of normal images each of which does not include a lesion site and (ii) a relative positional relationship of the classes to which a plurality of shift-invariant feature quantities respectively belong in the examination image, the classes being obtained by clustering the plurality of shift-invariant feature quantities which are: calculated from a plurality of pixels included in the normal images; and represented by the predetermined base vectors; and an output unit which outputs a result of the selection performed by the selecting unit.

It is to be noted that these generic and specific aspects may be implemented using a system, a method, an integrated circuit, a computer program, or a non-transitory computer-readable recording medium such as a compact disc read only memory (CD-ROM), and may also be implemented by any combination of systems, apparatuses, methods, integrated circuits, computer programs, and recording media.

According to various exemplary embodiments of the present disclosure, it is possible to perform accurate lesion detection.

BRIEF DESCRIPTION OF DRAWINGS

These and other advantages and features of the present disclosure will become apparent from the following description thereof taken in conjunction with the accompanying Drawings that illustrate general and specific exemplary embodiments of the present disclosure. In the Drawings:

FIG. 7 is a diagram illustrating an example of a normal image feature quantity vector.

FIG. 8 is a diagram illustrating an example of transforming the normal image feature quantity vector into a class number.

FIG. 9 is a diagram illustrating an example of a local feature normal structure database.

FIG. 12 is a diagram illustrating an example of a relative positional relationship normal structure database (relationship with the class of a neighboring right pixel).

FIG. 13 is a diagram illustrating an example of a relative positional relationship normal structure database (relationship with a neighboring right class).

FIG. 15 is a diagram illustrating an example of a procedure of determining a threshold to be used in lesion determination.

DETAILED DESCRIPTION

Figure 1:
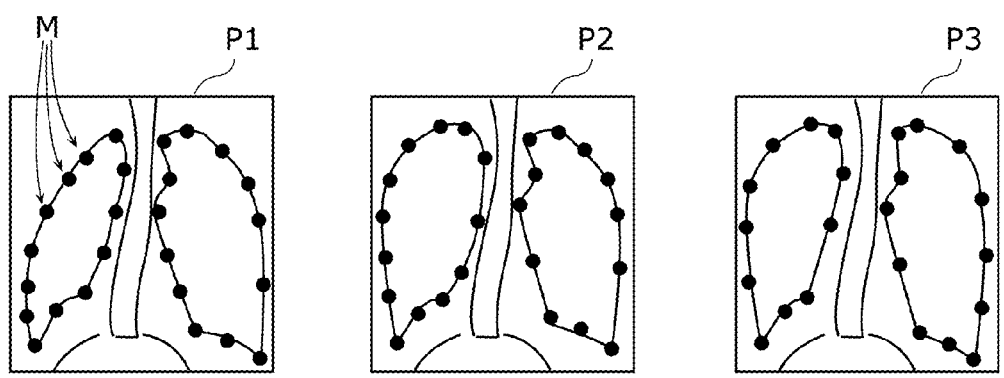
FIG. 1 is a diagram for describing a landmark setting according to PLT 1.

Underlying Knowledge Forming Basis of the Present Disclosure

The inventors have found the following problems related to the method disclosed by PLT 1 described in the "Background" section.

As stated above, position adjustment of the normal image and the examination image needs to be carried out for performing the difference calculation. In generating a normal image, a medical image captured previously is used in general. When a lesion site is not found by an examination of the examination image by an image interpreter, the image is determined as a normal image. More specifically, when there is no lesion site found in an examination image of a patient which was previously captured, it is possible to use the examination image as the normal image. However, it is often the case that the position of an organ or the like differs between the normal image and the examination image of even the same patient, due to a variety of factors such as the difference in image capturing conditions, a change in the body shape of a patient, and so on. In addition, when an examination image is captured for the first time, a normal image of the same patient is not present which is to be a subject for comparison. In such a case, a normal image of a different patient will be used as a subject for comparison, and this requires position adjustment of the normal image and the examination image due to the difference of the body shape of the different patient.

To be more specific, the position adjustment is implemented by geometric transformation such as rotation, parallel translation, enlargement, reduction, and so on. For example, a plurality of corresponding points are set to the normal image and the examination image, and affine transformation and enlargement or reduction are performed on one of the images such that the corresponding points of the images match.

By the way, a normal image is generated from an examination image which was previously captured and confirmed that there is no lesion. The reason for that is because, first, there is no medical image which can be a subject to be compared with an examination image of a patient whose image is captured for the first time, as described above. Secondly, medical knowledge tends to be established by piling up previous cases. The medical utility value is likely to be higher when generated from previous cases, also for a normal image which does not include a lesion. The medical knowledge is constantly advancing, and interpretation of the previous cases is modified in some cases. The medical knowledge registered on an IT system constantly requires update, and the normal image is no exception.

In view of the above, it is desirable to collect normal images of a plurality of patients and to generate a normal image with a high versatility to represent the collected normal images cyclopaedically. As a specific method to accomplish this, for example, PLT 1 discloses that a normal image is represented by a linear combination of an average shape and an eigen shape. In sum, the shape vector representing a normal structure is expressed by Expression 1 indicated below.

[Math. 1]

$$x = x_{ave} + Ps \cdot bs \qquad \text{Expression 1}$$

Here, $X_{ave}$ represents an average shape vector, Ps represents an eigen shape vector, and bs represents a set of shape coefficients.

The average shape vector $X_{ave}$ and the eigen shape vector Ps are necessary for the calculation of Expression 1, and a landmark M as illustrated in FIG. 1 is set on an image for vectorizing image information. In the diagram, the black dots are the landmarks M. The coordinates x and y of the landmarks M are elements of a vector, and the image information is vectorized. As shown in the examination images P1, p2, and P3, landmarks are set and a shape vector is defined individually for a plurality of normal images, and an average shape vector and an eigen shape vector are calculated from them. It is to be noted that the examination images are also expressed by Expression 1 in the same manner.

Position adjustment is carried out on the normal image and the examination image using the vectors described above, and a lesion site is detected from a difference between the normal image and the examination image, thereby supporting the diagnostic imaging.

However, the operation of setting a landmark is cumbersome according to the method described in PLT 1, leading to decreased efficiency of diagnosis practice. In addition, since the coordinate x and the coordinate y of the landmark changes and the vector element changes by changing the method of setting a landmark, the average shape vector and the eigen shape vector, as a result, differ from the average shape vector and the eigen shape vector before the change in the method of setting. PLT 1 fails to disclose the method of setting a landmark, and therefore various normal images (shape vectors representing the normal structure) are generated due to the difference in the method of setting a landmark and the variation of setting position of a landmark even when the same technique is employed. Medical knowledge is established by accumulating previous cases, and thus, in terms of reusability, it is problematic that a single case is defined in many ways according to the method of setting a landmark. As described above, it poses a problem of decrease in determination accuracy of a lesion site when a single case is defined in many ways. In other words, the same examination image is determined as a lesion image or as a normal image depending on the definition.

The present disclosure enables detection of a lesion without requiring the setting of a landmark for position adjustment, by describing a structure of a normal image using the shift-invariant feature quantity. Furthermore, by employing, as knowledge, a relative positional relationship between local image feature quantities, it is possible to detect a lesion more accurately, taking into consideration the structure of human body that cannot be represented only by a local feature.

In one general aspect, the techniques disclosed here feature an image processing apparatus including: an examination image obtaining unit which obtains an examination image which is an image of an examination subject; a shift-invariant feature quantity calculating unit which calculates, for each pixel, a shift-invariant feature quantity which is represented by predetermined base vectors, from the examination image obtained by the examination image obtaining unit; a selecting unit which selects, on the examination image, a pixel having a matching degree lower than or equal to a predetermined threshold, between (i) a relative positional relationship of classes in a plurality of normal images each of which does not include a lesion site and (ii) a relative positional relationship of the classes to which a plurality of shift-invariant feature quantities respectively belong in the examination image, the classes being obtained by clustering the plurality of shift-invariant feature quantities which are: calculated from a plurality of pixels included in the normal images; and represented by the predetermined base vectors; and an output unit which outputs a result of the selection performed by the selecting unit.

According to this configuration, the shift-invariant feature quantity calculated from a normal image and the shift-invariant feature quantity calculated from an examination image are represented by the same base vectors. This eliminates the necessity of setting a landmark for position adjustment between the normal image and the examination image. In addition, a pixel is selected using the matching degree between (i) the relative positional relationship of classes of the shift-invariant feature quantities in an examination image and (ii) the relative positional relationship of classes obtained from the result of clustering the shift-invariant feature quantities in a normal image. Thus, by employing, as knowledge, a relative positional relationship between the local image feature quantities, it is possible to detect a lesion more accurately, taking into consideration the structure of human body that cannot be represented only by a local feature.

For example, the shift-invariant feature quantity calculating unit may include: an image feature quantity calculating unit which calculates, for each pixel, an examination image feature quantity vector which has a plurality of the shift-invariant feature quantities as elements of a vector, from the examination image obtained by the examination image obtaining unit; and a base representing unit which calculates, for each pixel of the examination image, (i) coefficients used to represent the examination image feature quantity vector in a linear combination of normal image base vectors which are: base vectors of a plurality of normal image feature quantity vectors each of which is calculated from the pixels included in the normal images; and base vectors of the normal image feature quantity vectors each having the shift-invariant feature quantities as the elements of a vector, and (ii) an examination image base coefficient vector having the calculated coefficients as the elements of the vector, the selecting unit may include: a nearest neighbor vector obtaining unit which (i) obtains, for the each pixel of the examination image, a local feature normal structure vector which is most similar to an examination image base coefficient vector from a local feature normal structure database, and (ii) obtains: a class number of a class to which the obtained local feature normal structure vector belongs; and a distance between the examination image base coefficient vector and the obtained local feature normal structure vector, the local feature normal structure database storing, for each of classes obtained by clustering a plurality of normal image base coefficient vectors, the local feature normal structure vector which is a center vector representing at least one normal image base coefficient vector that belongs to the class, together with a class number of the class, the plurality of the normal image base coefficient vectors being obtained from the normal image feature quantity vectors and each having, as elements, coefficients used to represent the normal image feature quantity vector in the linear combination of the normal image base vectors; a relative positional relationship obtaining unit which obtains a structural matching degree of the each pixel of the examination image, using the class number obtained by the nearest neighbor vector obtaining unit, from a relative positional relationship normal structure database which stores, as the structural matching degree, a relative positional relationship of the classes in the normal images, the relative positional relationship being obtained from class numbers resulting from clustering performed on the normal image feature quantity vectors; and a pixel selecting unit which selects, on the examination image, a pixel of which (i) the distance obtained by the nearest neighbor vector obtaining unit is greater than or equal to a first threshold or (ii) the structural matching degree obtained by the relative positional relationship obtaining unit is smaller than or equal to a second threshold, and the output unit which outputs a result of the selection performed by the selecting unit.

According to this configuration, the examination image and the normal image are compared using the base coefficient vectors of the shift-invariant feature quantities. For that reason, it is possible to determine the presence or absence of a lesion without performing the position adjustment between the normal image and the examination image. Since the position adjustment processing is not required, there is no decrease in the accuracy of determining a lesion site caused by the difference in a setting method of a landmark or variation in a setting position, and thus it is possible to provide an image processing apparatus with high accuracy in determining a lesion site. Furthermore, a pixel, on an examination image, of which the structural matching degree indicating the relative positional relationship of classes in the normal image is lower than or equal to the second threshold. For that reason, it is possible to select a pixel, on the examination image, which has a structure different from a structure of the normal image. Thus, it is possible to detect a lesion more accurately, taking into consideration the structure of human body that cannot be represented only by a local feature.

To be specific, the pixel selecting unit may include a lesion determining unit which determines, on the examination image, a pixel of which (i) the distance obtained by the nearest neighbor vector obtaining unit is greater than or equal to a first threshold or (ii) the structural matching degree obtained by the relative positional relationship obtaining unit is smaller than or equal to a second threshold, as a pixel of a lesion site, and the output unit may output a result of the determination performed by the lesion determining unit.

In addition, the relative positional relationship normal structure database may store an appearance probability of classes of pixels located to be in a predetermined positional relationship, as the structural matching degree, and the relative positional relationship obtaining unit may (i) identify classes of the pixels located to be in the predetermined positional relationship in the examination image, using the class number obtained by the nearest neighbor vector obtaining unit, and (ii) obtain the appearance probability of the classes of the pixels located to be in the predetermined positional relationship from the relative positional relationship normal structure database, to obtain the structural matching degree of each of the pixels included in the examination image.

According to this configuration, by employing, as the matching degree, the appearance probability of classes of pixels located to be in a predetermined positional relationship in the normal image, it is possible to detect, as a lesion site, a combination of classes which is not often appear in the normal image when the combination appears in the examination image.

In addition, the relative positional relationship normal structure database may store, as a structural matching degree, an appearance probability of classes of pixels aligned in a predetermined direction and having different class numbers, and the relative positional relationship obtaining unit may obtain, from the relative positional relationship normal structure database, the appearance probability of the classes of pixels aligned in the predetermined direction and having the different class numbers in the examination image, using the class number obtained by the nearest neighbor vector obtaining unit, to obtain a structural matching degree of each of the pixels included in the examination image.

The probability that the same class appears in adjacent pixels is high in some cases. However, according to this configuration, it is possible to perform lesion detection, using the appearance probability of a class of pixels which are present at positions that are mutually distant to some extent and have different class numbers, as the matching degree. For that reason, the structure of the examination image is more easily captured, and thus it is possible to increase the accuracy in the lesion detection.

In another general aspect, the techniques disclosed here feature an image processing apparatus including: a normal image obtaining unit which obtains a plurality of normal images which are images including no lesion; an image feature quantity calculating unit which calculates, for each pixel, a normal image feature quantity vector which has a plurality of shift-invariant feature quantities as elements of a vector, from each of the normal images obtained by the normal image obtaining unit; a principal component analysis unit which performs principal component analysis on the normal image feature quantity vectors calculated, by the image feature quantity calculating unit, from pixels included in the normal images to obtain (i) normal image base vectors which are base vectors of the normal image feature quantity vectors and (ii) a plurality of normal image base coefficient vectors resulting from base conversion performed on the normal image feature quantity vectors using the normal image base vectors; a base vector output unit which writes, on a base vector storage, the normal image base vector obtained by the principal component analysis unit; a clustering unit which performs clustering on the normal image base coefficient vectors to obtain, for each class, a center vector which represents at least one of the normal image base coefficient vectors which belong to the class; a center vector output unit which writes, on a local feature normal structure database, the center vector obtained by the clustering unit, together with a class number of a class represented by the center vector; a relative positional relationship calculating unit which calculates, as a structural matching degree, a relative positional relationship of classes in the normal images, the relative positional relationship being obtained from the class number; and a relative positional relationship output unit which writes, as the structural matching degree, a relative positional relationship calculated by the relative positional relationship calculating unit, between classes in the normal images, on a relative positional relationship normal structure database.

According to this configuration, it is possible to generate, as knowledge, a structural matching degree indicating a relative positional relationship of classes in a normal image. The image processing apparatus described above uses such knowledge, thereby making it possible to detect a lesion accurately.

For example, the shift-invariant feature quantity may include a wavelet coefficient, a higher order local autocorrelation (HLAC) feature quantity, a scale-invariant feature transform (SIFT) feature quantity, or a histogram of oriented gradients (HOG) feature quantity.

In addition, the image may be one of a radiological image, an ultrasound image, and a pathological specimen image.

It is to be noted that these generic and specific aspects may be implemented using a system, a method, an integrated circuit, a computer program, or a non-transitory computer-readable recording medium such as a compact disc read only memory (CD-ROM), and may also be implemented by any combination of systems, apparatuses, methods, integrated circuits, computer programs, and recording media.

Hereinafter, certain exemplary embodiments are described in greater detail with reference to the accompanying Drawings.

Each of the exemplary embodiments described below shows a general or specific example. The numerical values, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

Figure 2:
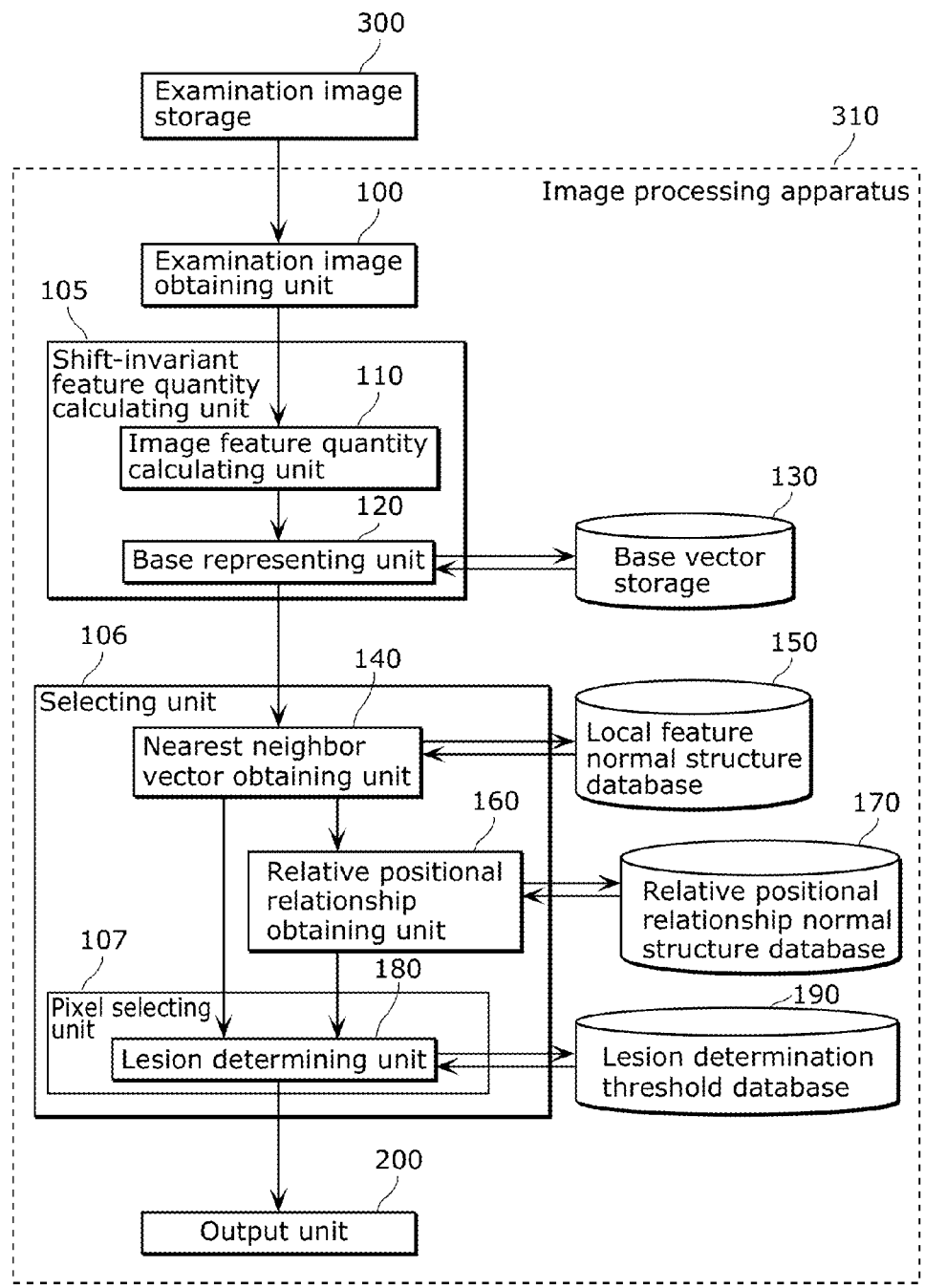
FIG. 2 is a block diagram illustrating a configuration of an image processing apparatus according to one exemplary embodiment.

FIG. 2 is a block diagram which illustrates a configuration of an image processing apparatus according to the exemplary embodiment.

According to the exemplary embodiment, first as a preparation, an examination image captured by a medical device is stored in an examination image storage 300. An image processing apparatus 310 obtains an examination image from the examination image storage 300 to detect a lesion site from the obtained examination image, and outputs a result of the detection.

The image processing apparatus 310 includes: a base vector storage 130; a local feature normal structure database 150; a relative positional relationship normal structure database 170; a lesion determination threshold database 190; an examination image obtaining unit 100; a shift-invariant feature quantity calculating unit 105; a selecting unit 106; and an output unit 200.

The base vector storage 130 stores a normal image base vectors (a normal image base vector matrix, a normal image average vector). The normal image base vectors are base vectors of a plurality of normal image feature quantity vectors calculated from a plurality of pixels included in a plurality of normal images, and each of the normal image feature quantity vectors has, as elements, a plurality of shift-invariant feature quantities The local feature normal structure database 150 stores a plurality of local feature normal structure vectors calculated in advance from the normal images. The local feature normal structure vector is a center vector which represents one or more normal image base coefficient vectors which belong to the respective classes obtained by clustering a plurality of normal image base coefficient vectors that will be described later. Here, the normal image base coefficient vector has, as elements, coefficients used to represent the normal image feature quantity vector in a linear combination of the normal image base vectors.

The relative positional relationship normal structure database 170 stores a structural matching degree between local feature quantities which are local shift-invariance feature quantities calculated in advance from a plurality of normal images. More specifically, the relative positional relationship normal structure database 170 stores, as the structural matching degree, a relative positional relationship of classes in a plurality of normal images obtained from class numbers resulting from the clustering performed on the normal image feature quantity vectors.

The lesion determination threshold database 190 stores a first threshold and a second threshold as thresholds for determining a lesion.

It is to be noted that, the base vector storage 130, the local feature normal structure database 150, the relative positional relationship normal structure database 170, and the lesion determination threshold database 190 may be included in the image processing apparatus 310, or may be disposed outside the image processing apparatus 310 and connected to the image processing apparatus 310 via wired or wireless communication. The local feature normal structure database 150, the relative positional relationship normal structure database 170, and the lesion determination threshold database 190 are storages each configured by hardware or the like, and in the description below, data stored in the storages also referred to as database.

The examination image obtaining unit 100 obtains an examination image which is a medical image of an examination subject stored in the examination image storage 300.

The shift-invariant feature quantity calculating unit 105 calculates, for each pixel, a shift-invariant feature quantity which is represented by a predetermined base vector, from the examination image obtained by the examination image obtaining unit 100. Details of the shift-invariant feature quantity calculating unit 105 will be described later.

The selecting unit 106 selects, on the examination image, a pixel having a matching degree lower than or equal to a predetermined threshold, between (i) a relative positional relationship of classes and (ii) a relative positional relationship of the classes to which a plurality of shift-invariant feature quantities respectively belong. The classes are obtained by clustering the plurality of shift-invariant feature quantities which are: calculated from a plurality of pixels included in the normal images each of which does not include a lesion site; and represented by the predetermined base vectors. The details of the selecting unit 106 will be described later.

The shift-invariant feature quantity calculating unit 105 includes an image feature quantity calculating unit 110 and a base representing unit 120.

The image feature quantity calculating unit 110 calculates, for each pixel, an examination image feature quantity vector which has, as elements, a plurality of shift-invariant feature quantities, from the examination image obtained by the examination image obtaining unit 100.

The base representing unit 120 obtains normal image base vectors from the base vector storage 130, and transforms the examination image feature quantity vector calculated by the image feature quantity calculating unit 110 into base representation. More specifically, the base representing unit 120 calculates, for each pixel of the examination image, coefficients used to represent the examination image feature quantity vector in the linear combination of the normal image base vectors, and calculates an examination image base coefficient vector which has the calculated coefficients as elements.

The selecting unit 106 includes: a nearest neighbor vector obtaining unit 140; a relative positional relationship obtaining unit 160; and a pixel selecting unit 107.

The nearest neighbor vector obtaining unit 140 compares (i) the examination image base coefficient vector calculated by the base representing unit 120 and (ii) each of the local feature normal structure vectors which are stored in the local feature normal structure database 150 and calculated from a plurality of normal images in advance, and obtains, for each of the pixels of the examination image, the local feature normal structure vector of which the distance from the examination image base coefficient vector is shortest. At this time, the nearest neighbor vector obtaining unit 140 obtains (i) the class numbers of classes to which the obtained local feature normal structure vectors respectively belong and (ii) a distance between the examination image base coefficient vector and each of the obtained local feature normal structure vectors.

The relative positional relationship obtaining unit 160 obtains the matching degree of the relative positional relationship between the local feature quantities of the examination image, from the relative positional relationship normal structure database 170 in which the structural matching degree between the local feature quantities calculated in advance from the normal image is stored. In sum, the relative positional relationship obtaining unit 160 obtains the structural matching degree of each of the pixels of the examination image, using the class number obtained by the nearest neighbor vector obtaining unit 140, from the relative positional relationship normal structure database 170.

The pixel selecting unit 107 is a processing unit which selects a pixel on the examination image, of which the distance obtained by the nearest neighbor vector obtaining unit 140 is greater than or equal to the first threshold, or of which the structural matching degree obtained by the relative positional relationship obtaining unit 160 is smaller than or equal to the second threshold, and includes a lesion determining unit 180.

The lesion determining unit 180 obtains a threshold for determining a lesion from the lesion determination threshold database 190 to perform lesion determination through threshold processing. As the threshold, two types of thresholds are used, that is, the first threshold for performing abnormality determination using the local feature quantity and the second threshold for performing abnormality determination using the structural relationship. The lesion determining unit 180 determines, as the pixel of the lesion site, the pixel of the examination image corresponding to the examination image base coefficient vector, when the distance between (i) the examination image base coefficient vector obtained by the nearest neighbor vector obtaining unit 140 and (ii) the local feature normal structure vector that is most similar to the examination image base coefficient vector is greater than or equal to the first threshold for determining the local feature quantity. In addition, the lesion determining unit 180, when the structural matching degree obtained by the relative positional relationship obtaining unit 160 is smaller than or equal to the second threshold for determining the structural relationship, determines the pixel of the examination image corresponding to the structural matching degree as the pixel of the lesion site.

The output unit 200 outputs the result of the determination performed by the lesion determining unit 180. For example, the output unit 200 displays the portion determined as the lesion, on a display screen such as a display apparatus.

Figure 3:
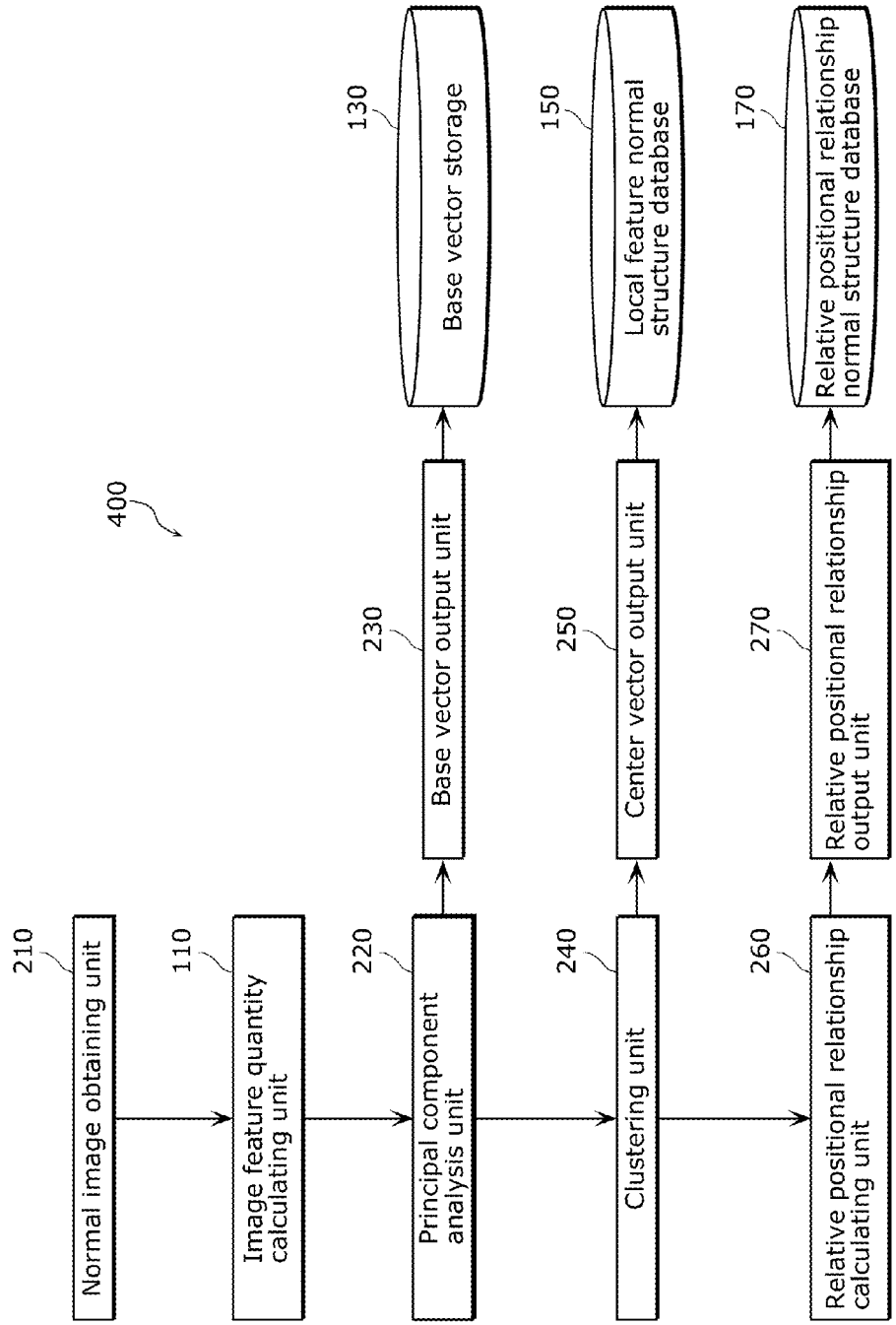
FIG. 3 is a block diagram which illustrates a configuration of an image processing apparatus for generating data to be used by the image processing apparatus illustrated in FIG. 2.

FIG. 3 is a block diagram which illustrates a configuration of an image processing apparatus which generates data to be used by the image processing apparatus 310 illustrated in FIG. 2. More specifically, an image processing apparatus 400 generates a base vector stored in the base vector storage 130, the local feature normal structure database 150, and the relative positional relationship normal structure database 170.

The image processing apparatus 400 includes: a normal image obtaining unit 210; the image feature quantity calculating unit 110; a principal component analysis unit 220; a base vector output unit 230; the base vector storage 130; a clustering unit 240; a center vector output unit 250; the local feature normal structure database 150; a relative positional relationship calculating unit 260; a relative positional relationship output unit 270; and the relative positional relationship normal structure database 170.

The normal image obtaining unit 210 reads, as a normal image, an image confirmed in advance that there is no abnormality by a doctor. In other words, the normal image obtaining unit 210 obtains a plurality of normal images which are images including no lesion.

The image feature quantity calculating unit 110 calculates an image feature quantity from the normal image obtained by the normal image obtaining unit 210, and generates a normal image feature quantity vector. In other words, the image feature quantity calculating unit 110 calculates, for each pixel, a normal image feature quantity vector which has, as elements of a vector, a plurality of shift-invariant feature quantities, from each of the normal images obtained by the normal image obtaining unit 210.

The principal component analysis unit 220 performs principal component analysis on the normal image feature quantity vector obtained by the image feature quantity calculating unit 110, and obtains normal image base vectors and a normal image base coefficient vector which is obtained by representing the normal image feature quantity vector by base representation. More specifically, the principal component analysis unit 220 performs principal component analysis on the normal image feature quantity vectors calculated, by the image feature quantity calculating unit 110, from a plurality of pixels included in a plurality of normal images, thereby obtaining (i) normal image base vectors which are the base vectors of the normal image feature quantity vectors and (ii) normal image base coefficient vectors resulting from base conversion performed on the normal image feature quantity vectors using the normal image base vectors.

The base vector output unit 230 stores the normal image base vectors obtained by the principal component analysis unit 220 into the base vector storage 130.

The clustering unit 240 performs clustering on the normal image base coefficient vectors obtained by the principal component analysis unit 220, calculates, for each class, a center vector of at least one of the normal image base coefficient vectors included in the class, and assigns a class number to at least one of the normal image base coefficient vectors included in the class.

The center vector output unit 250 writes the center vector of each of the classes obtained by the clustering unit 240, as a local feature normal structure vector representing a local normal structure, together with the class number into the local feature normal structure database 150.

The relative positional relationship calculating unit 260 calculates, as a structural matching degree, the relative positional relationship of each of the classes, based on the class number of each of the normal image base coefficient vectors obtained by the clustering unit 240.

The relative positional relationship output unit 270 writes the relative positional relationship of the classes obtained by the relative positional relationship calculating unit 260, as the structural matching degree, onto the relative positional relationship normal structure database 170.

The following describes in detail the operations performed by the image processing apparatus 310 and the image processing apparatus 400 according to the exemplary embodiment.

[Preparation of Database]

In the exemplary embodiment, a database of a normal structure based on a shift-invariant local image feature quantity is constructed so as to eliminate the need for position adjustment. More specifically, the image processing apparatus 400 stores the shift-invariant local image feature quantity obtained from the normal image and the relative positional relationship between the local feature quantities, into the local feature normal structure database 150 and the relative positional relationship normal structure database 170, respectively. The image processing apparatus 310 eliminates the need for position adjustment of the overall image, by employing the shift-invariant local feature quantity as a criteria for lesion determination. In addition, the image processing apparatus 310 enables determination of being normal or abnormal in the structure of human body, which cannot be determined by only the local feature quantity, by employing the relative positional relationship between local feature quantities as the criteria for lesion determination.

Figure 4:
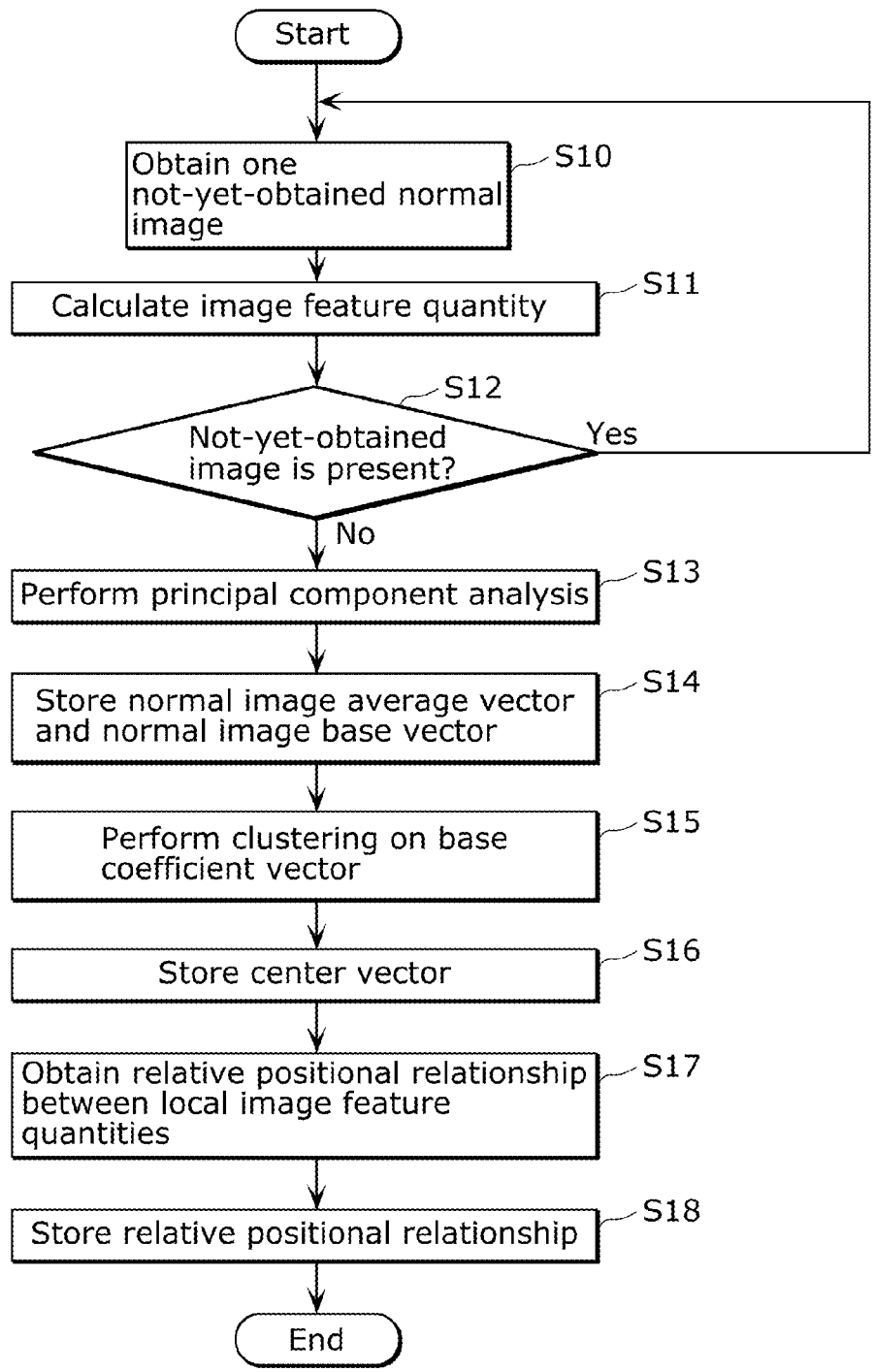
FIG. 4 is a flowchart illustrating a procedure for generating a normal structure database.

The following describes the procedure of generation of the normal structure database performed by the image processing apparatus 400, with use of the flowchart illustrated in FIG. 4. Although a plain chest X-ray image is used as a subject medical image in the exemplary embodiment, equivalent processing is possible by using a medical image such as a computer tomography (CT) image, a magnetic resonance imaging (MRI) image, a positron emission tomography (PET) image, a pathological image.

In Step S10, the normal image obtaining unit 210 obtains one normal image for generating a normal structure database. As the normal image, a medical image on which a doctor has made a diagnosis and which has been confirmed that there is no abnormality. Medical images captured in a large number of hospitals are currently stored in picture archiving and communication systems (PSCS) together with diagnosis results. For that reason, it is easy to collect normal images in large numbers. It is desirable to use more than hundreds and thousands of normal images to generate a normal structure database.

In Step S11, the image feature quantity calculating unit 110 calculates, from the normal image obtained in Step S10, a shift-invariant feature quantity that is a shift-invariant image feature quantity, vectorizes image information using the shift-invariant feature quantity, and outputs a normal image feature quantity vector f. In the exemplary embodiment, a wavelet coefficient is used as the shift-invariant image feature quantity.

Figure 5:
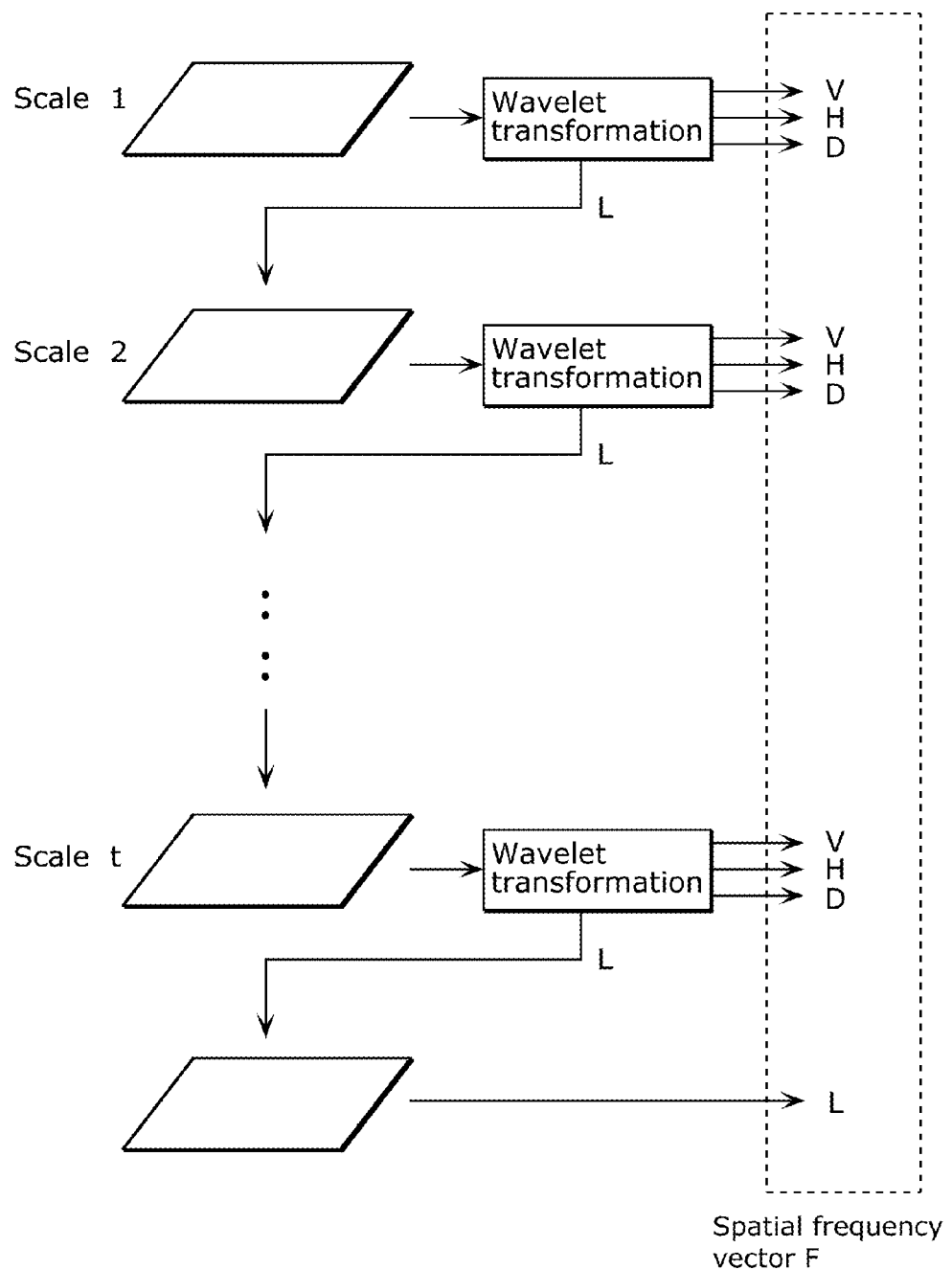
FIG. 5 is a diagram illustrating an example of calculating shift-invariant image feature quantity according to wavelet transformation.

FIG. 5 illustrates an example of calculating a shift-invariant image feature quantity according to wavelet transformation. The image feature quantity calculating unit 110 performs multiresolution representation of scale t on a normal image using the wavelet transformation.

In scale 1, a luminance difference between adjacent pixels is calculated, and smoothing is performed between a plurality of pixels when shifting to scale 2.

Although a luminance difference between adjacent pixels is calculated in scale 2 as well, each of the pixels in scale 2 is a result of smoothing the pixels in scale 1, and thus the frequency component is lower in scale 2. Thus, by proceeding with the calculation from scale 1 to scale t (t is an integer greater than or equal to two), the wavelet coefficients V, H, and D are calculated in each scale while gradually shifting from the high-frequency component to the low frequency component. The image feature quantity calculating unit 110 generates, for each of the pixels, a spatial frequency vector F which includes (i) the wavelet coefficients V, H, and D calculated in each stage and (ii) a luminance average value L calculated from an image of scale t. In other words, the dimension number of the spatial frequency vector F is (3t+1) dimension.

Figure 6A:
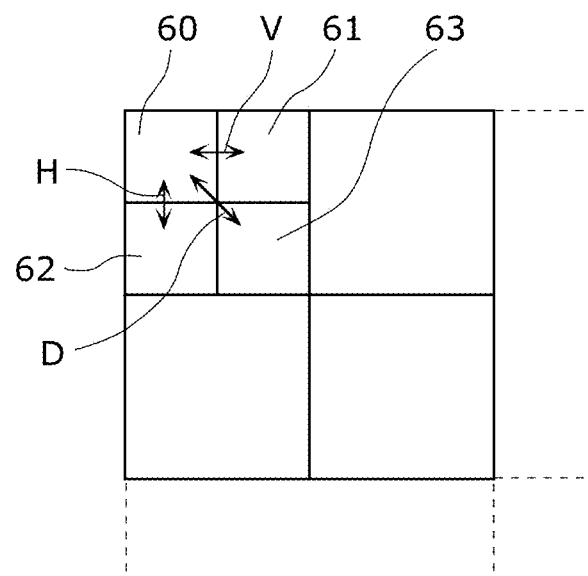
FIG. 6A is a diagram illustrating an example of calculating a wavelet coefficient employing Haar's mother wavelet.
Figure 6B:
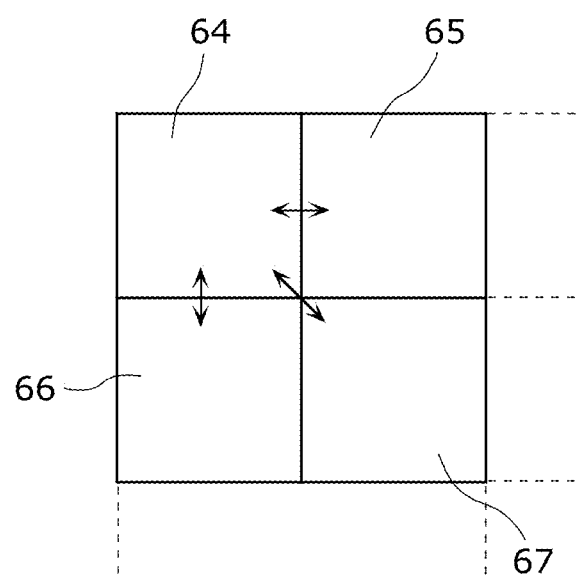
FIG. 6B is a diagram illustrating an example of calculating a wavelet coefficient employing Haar's mother wavelet.

When Haar's mother wavelet is employed, as illustrated in FIG. 6A, V denotes the luminance difference value of the pixel 60 to be processed from the right adjacent pixel 61, H denotes the luminance difference value of the pixel 60 to be processed from the lower adjacent pixel 62, D denotes the luminance difference value from the diagonally lower right adjacent pixel 63, and L denotes the luminance average value of four pixels including the pixel 60 to be processed, the right adjacent pixel 61, the lower adjacent pixel 62, and the diagonally lower right adjacent pixel 63. FIG. 6A corresponds to scale 1 and FIG. 6B corresponds to scale 2. The examination image of scale 2 is an image in which each pixel has the luminance average value of four pixels of the examination image of scale 1. In other words, in scale 2, an output L which is the luminance average value of four pixels of scale 1 is the luminance value of a block which is the target for calculating the luminance difference value. The output V of scale 2 is the luminance difference value between the block 64 and the right adjacent block 65, the output H of scale 2 is the luminance difference value between the block 64 and the lower adjacent block 66, and the output D of scale 2 is the luminance difference value between the block 64 and the diagonally lower right adjacent block 67. In addition, the output L of scale 2 is the luminance average value of four blocks, from the block 64 to the diagonally lower right adjacent block 67.

Through the processes described above, when the wavelet transformation is employed, the normal image feature quantity vector f is calculated as the spatial frequency vector F illustrated in FIG. 5.

It is to be noted that, although the wavelet coefficient is used as the shift-invariant image feature quantity in the exemplary embodiment, the shift-invariant feature quantity is not limited to this, and an arbitrary shift-invariant feature quantity may be employed. For example, it is possible to use SIFT feature quantity, HLAC feature quantity, HOG feature quantity, and so on can be used as the shift-invariant feature quantity.

In Step S12, the normal image obtaining unit 210 determines whether or not a normal image which has not been obtained is present. When there is a normal image which has not been obtained is present, the process goes backs to Step S10, and the process of obtaining a not-yet-obtained image and extracting an image feature (S11) is repeated. When all of the normal images have already been obtained, the process proceeds to Step S13.

In Step S13, the principal component analysis unit 220 performs principal component analysis on the normal image feature quantity vector obtained in the process in or prior to Step S12, and calculates the normal image average vector g, the normal image base vectors matrix B, and the normal image base coefficient vector. FIG. 7 illustrates an example of the normal image feature quantity vector obtained in or prior to Step S12. When a normal image has the width of W and the height of H, (W×H) normal image feature quantity vectors are calculated from a single normal image. When the number of normal images is Q, (W×H×Q) normal image feature quantity vectors are obtained from Q normal images. The dimension number of the normal image feature quantity is assumed to be n dimension.

The normal image average vector g is obtained by calculating an average value for each element of the normal image feature quantity vectors.

The normal image base vectors matrix B is calculated as eigen vectors b1, b2, . . . , bn which are the solutions of the simultaneous equation of Expression 2 below, by the analysis of principal component.

[Math. 2]

$$Sb_1 = \lambda_1 b_1$$
$$Sb_2 = \lambda_2 b_2$$
$$\vdots$$
$$Sb_n = \lambda_n b_n$$

Expression 2

Here, the matrix S is a variance-covariance matrix, and is provided by Expression 3 below.

[Math. 3]

$$S = \begin{pmatrix} s_1^2 & s_1 s_2 & \cdots & s_1 s_n \\ s_1 s_2 & s_2^2 & \cdots & s_2 s_n \\ \vdots & \vdots & \ddots & \vdots \\ s_1 s_n & s_2 s_n & \cdots & s_n^2 \end{pmatrix}$$

Expression 3

In the expression, si is a variance of i-dimension element of the image feature quantity vector. As described above, the image feature quantity vector is obtained for the number of (W×H×Q), and thus i-dimension element of the image feature quantity vector is present for the number of (W×H×Q). Thus, si is the variance of them.

In addition, the eigen value A is provided by Expression 4.

[Math. 4]

$$\begin{vmatrix} s_1^2 - \lambda & s_1 s_2 & \cdots & s_1 s_n \\ s_1 s_2 & s_2^2 - \lambda & \cdots & s_2 s_n \\ \vdots & \vdots & \ddots & \vdots \\ s_1 s_n & s_2 s_n & \cdots & s_n^2 - \lambda \end{vmatrix} = 0$$

Expression 4

The eigen value λ is obtained for the number of n, and denoted as λ1, λ2, . . . , λn in descending order.

The normal image base coefficient vector a is calculated according to Expression 5.

[Math. 5]

$$\alpha = B^{-1}(f - g)$$

$$\Leftrightarrow \begin{pmatrix} \alpha_1 \\ \alpha_2 \\ \vdots \\ \alpha_n \end{pmatrix} = (b_1 \; b_2 \; \cdots \; b_n)^{-1}(f - g)$$

$$\Leftrightarrow \begin{pmatrix} \alpha_1 \\ \alpha_2 \\ \vdots \\ \alpha_n \end{pmatrix} = \begin{pmatrix} b_{1,1} & b_{2,1} & \cdots & b_{n,1} \\ b_{1,2} & b_{2,2} & \cdots & b_{n,2} \\ \vdots & \vdots & \vdots & \vdots \\ b_{1,n} & b_{2,n} & \cdots & b_{n,n} \end{pmatrix}^{-1} \begin{pmatrix} f_1 - g_1 \\ f_2 - g_2 \\ \vdots \\ f_n - g_n \end{pmatrix}$$

Expression 5

Here, the vector f is the normal image feature quantity vector.

In Step S14, the base vector output unit 230 stores the normal image average vector g and the normal image base vector matrix B which have been obtained in Step S13, into the base vector storage 130.

In Step S15, the clustering unit 240 performs clustering on the normal image base coefficient vectors obtained in Step S13, and determines the class number of each class. Furthermore, the center vector of each class is obtained concurrently.

In the exemplary embodiment, k-means method is employed as a technique of clustering. According to K-means method, all of the normal image base coefficient vectors are classified into classes by repeating calculation of the center vector of each of the classes and classifying the normal image base coefficient vectors into classes (allocation into a class having the shortest distance from the center vector). FIG. 8 illustrates an example of determining the class number of the normal image base coefficient vector. For example, it is shown that the normal image base coefficient vector of a pixel of which a coordinate (x, y) is (1, 1) in the first image is classified into the class having the class number of 0.

In Step S16, the center vector output unit 250 stores the center vector of each of the classes calculated in Step S15, as the local normal structure, into the local feature normal structure database 150.

FIG. 9 illustrates an example of a local feature normal structure database. As illustrated in FIG. 9, the local feature normal structure database 150 holds the class number and the center vector thereof as a set.

In Step S17, the relative positional relationship calculating unit 260 calculates a relative positional relationship between the local feature quantities, as the structural relationship (structural matching degree), based on the class number of the normal image feature quantity vector obtained in Step S15.

Figure 10:
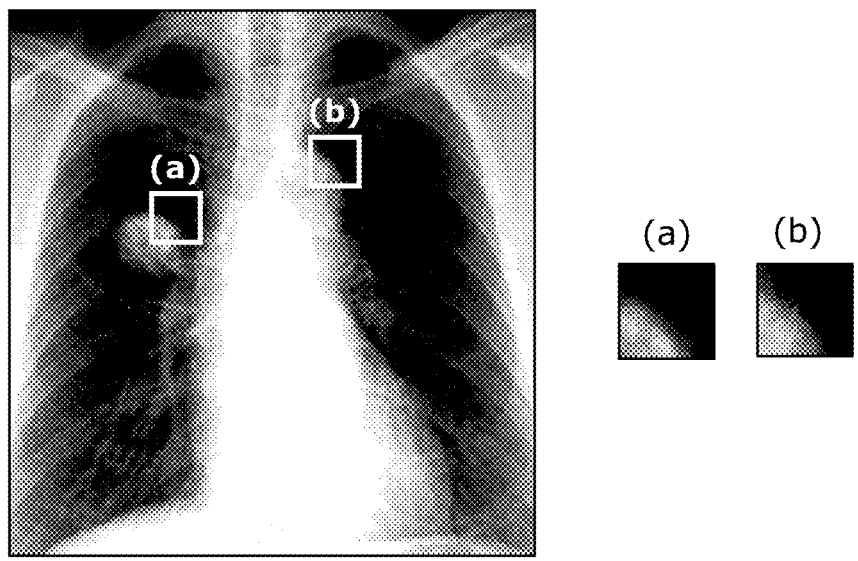
FIG. 10 is a diagram illustrating an example of the case where a lesion site cannot be determined correctly using only the local feature quantity.

FIG. 10 shows an example in which the structural relationship is required for properly determining a lesion site. In FIG. 10, the region (a) is a lesion site, and the region (b) is a normal portion, and when they are compared by the local image feature quantities, they have substantially the same pattern. For that reason, similar image feature quantities are extracted from each of the regions. Thus, it is difficult to distinguish the region (a) from the region (b) only by the local image feature quantities.

Figure 11:
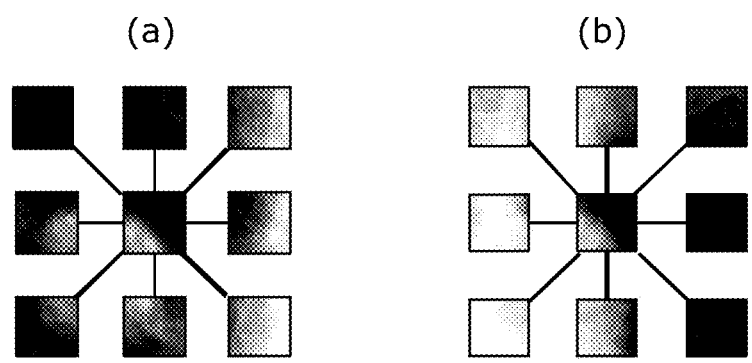
FIG. 11 is a diagram illustrating an example of the case where a relative positional relationship between the local feature quantities is employed as the structure relationship.

In the exemplary embodiment, the structural relationship is employed in order to solve the above-described problem. As illustrated in FIG. 11, it is possible to distinguish between normality and abnormality of an image by taking into account the relative positional relationship between the local feature quantities extracted from the image. In the case of FIG. 10, by taking the structural relationship with the surrounding area into account, it can be seen that the region (a) is an abnormal portion in which a tumor is developed, and the region (b) is a part of the normal portion.

In the exemplary embodiment, by capturing the relative positional relationship with the surrounding area as a structure, it is possible to determine whether the region (a) and the region (b) are present in the right or left of the spine, for example.

According to the exemplary embodiment, the probability that classes are adjacent to each other is used as the relative positional relationship (structural matching degree) between the local feature quantities. In Step S15, the class number of the normal image feature quantity vector of each coordinate is calculated. For that reason, the relative positional relationship calculating unit 260 is capable of obtaining the probability that the classes are adjacent to each other in a normal image.

FIG. 12 is a table which indicates, when focusing on a pixel, the probability that each class appears in a right to the right of the focus pixel. For example, when a focus pixel is a pixel of the class 1, the probability that the class 1 appears in the right pixel is 0.8. In addition, the probability that the class 2 appears in the right pixel is 0.09. When a local feature quantity appears in the examination image, it is possible to determine the structural normality as viewed including the surrounding area, by employing the table as described above. It is indicated that a focus pixel with a large value (probability) in the table in FIG. 12 has the relative positional relationship between the local feature quantities frequently appearing in the normal image. For that reason, it is highly likely that the focus pixel has a normal structure. On the other hand, it is indicated that a focus pixel with a small value in the table is highly likely to be structurally abnormal. According to the exemplary embodiment, the table that represents such a structural relationship is obtained for the surrounding eight directions.

It is to be noted that the table that represents the structural relationship is not necessarily limited to the table obtained for the surrounding eight directions, and it is also possible to obtain the table using the relationship with a pixel located away by two or more pixels, or using the relationship with a class from which there is a distance not to overlap the region covered by the wavelet transformation.

In addition, it is also possible to regard adjacent similar classes as the same group to make a database of the relationship with an adjacent different class. FIG. 13 shows the probability that a class different from the class of the focus pixel appears, for each class number, when the pixels are traced rightward from the focus pixel. For example, it is indicated that, in the case where the class number of the focus pixel is 1, the probability that a pixel of the class 2 appears first when traced rightward is 0.09, and, the probability that a pixel of the class 3 appears first when traced rightward is 0.02. The probability that adjacent pixels are in the same class is high in some cases. For that reason, the structure is more easily captured, by holding the relationship with the local image feature quantity obtained from a position that is distant to some extent, and thus it is possible to increase accuracy. In other words, the probability that the same class appears in adjacent pixels is high in some cases. However, according to this configuration, it is possible to perform lesion detection, using appearance probability of classes of pixels which are present at positions that are mutually distant to some extent and have different class numbers, as a matching degree. For that reason, the structure of the examination image is more easily captured, and thus it is possible to increase the accuracy in lesion detection.

In Step S18, the relative positional relationship output unit 270 stores the relative positional relationship between the local feature quantities in the normal image calculated in Step S17, into the relative positional relationship normal structure database 170.

[Lesion Detection]

Figure 14:
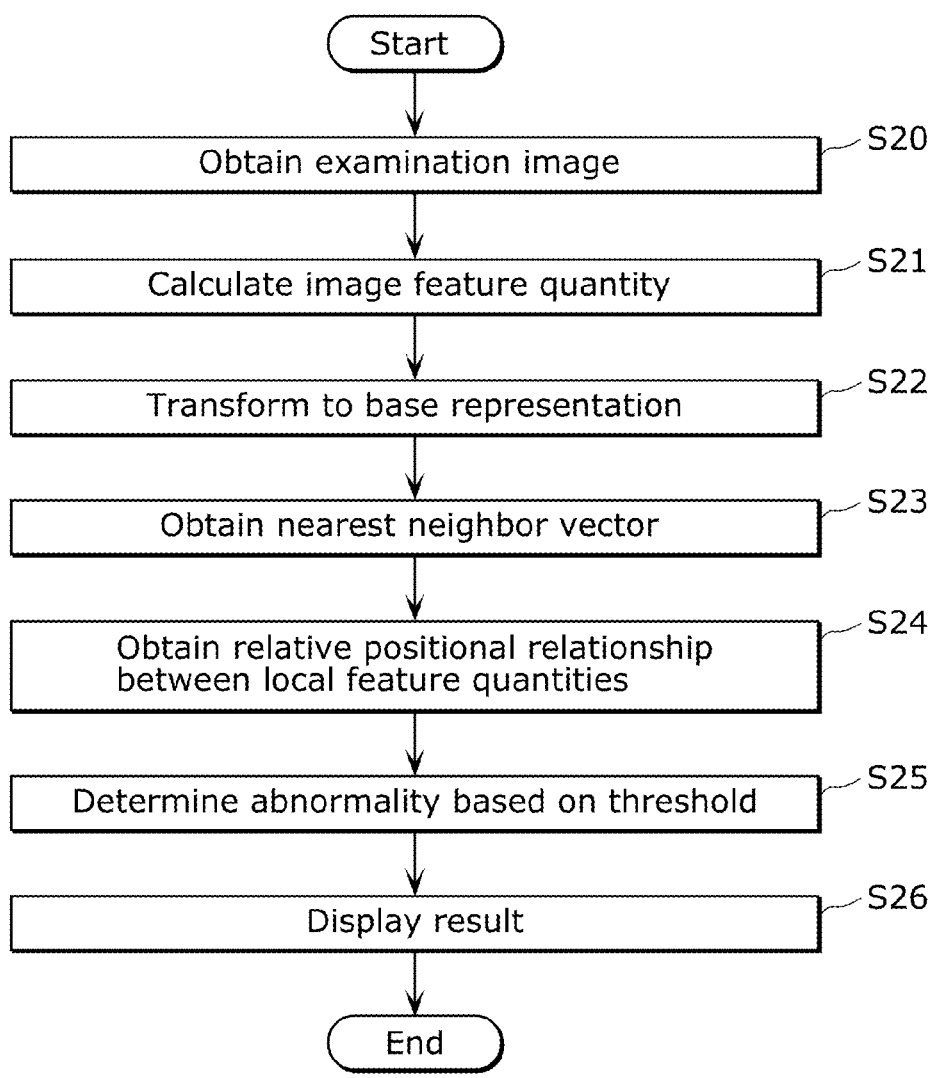
FIG. 14 is a flowchart illustrating a procedure of lesion detecting processing.

The following describes the procedure of lesion detection performed by the image processing apparatus illustrated in FIG. 2, with use of the flowchart illustrated in FIG. 14.

In Step S20, the examination image obtaining unit 100 obtains an examination image which is a subject for the lesion detection, from the examination image storage 300.

In Step S21, the image feature quantity calculating unit 110, for the examination image obtained in Step S20, vectorizes image information using the shift-invariant feature quantity, and outputs an examination image feature quantity vector fp. Step S21 can be implemented by performing a similar process to Step S11.

In Step S22, the base representing unit 120 transforms the examination image feature quantity vector fp calculated in Step S21 to base vector representation, thereby obtaining the examination image base coefficient vector op.

First, the base representing unit 120 obtains, from the base vector storage 130, the normal image average vector g and the normal image base vector matrix B for transformation into base representation. The base representing unit 120 transforms the examination image feature quantity vector fp to the examination image base coefficient vector op according to Expression 6 below.

[Math. 6]

$$\alpha_p = B^{-1}(f_p - g) \quad \text{Expression 6}$$

$$\Leftrightarrow \begin{pmatrix} \alpha_{p,1} \\ \alpha_{p,2} \\ \vdots \\ \alpha_{p,n} \end{pmatrix} = (b_1 \ b_2 \ \ldots \ b_n)^{-1}(f_p - g)$$

$$\Leftrightarrow \begin{pmatrix} \alpha_{p,1} \\ \alpha_{p,2} \\ \vdots \\ \alpha_{p,n} \end{pmatrix} = \begin{pmatrix} b_{1,1} & b_{2,1} & \ldots & b_{n,1} \\ b_{1,2} & b_{2,2} & \ldots & b_{n,2} \\ \vdots & \vdots & \vdots & \vdots \\ b_{1,n} & b_{2,n} & \ldots & b_{n,n} \end{pmatrix}^{-1} \begin{pmatrix} f_{p,1} - g_1 \\ f_{p,2} - g_2 \\ \vdots \\ f_{p,n} - g_n \end{pmatrix}$$

Expression 6 has the same structure as Expression 5, and the examination image base coefficient vector op is calculated by providing the examination image feature quantity vector fp in place of the normal image feature quantity vector f of Expression 5.

As described above, the base representing unit 120 transforms the image feature quantity vector of the examination image to the base representation, thereby enabling comparison between the examination image and the normal image.

In Step S23, the nearest neighbor vector obtaining unit 140 obtains, from the local feature normal structure database 150, a local feature normal structure vector having the shortest distance from the examination image base coefficient vector obtained in Step S22 and a class number thereof.

At this time, the nearest neighbor vector obtaining unit 140 concurrently calculates the distance between the obtained local feature normal structure vector and the examination image base coefficient vector. The vector stored in the local feature normal structure database is generated from a normal image. For that reason, when the local feature normal structure vector having a short distance is present in greater number, the examination image is likely to be normal.

In Step S24, the relative positional relationship obtaining unit 160 obtains, from the relative positional relationship normal structure database 170, the matching degree of the relative positional relationship between the local feature quantities, based on the class number of the local feature quantity obtained in Step S23. In Step S23, the class number of the local feature normal structure vector which is most similar to the examination image base coefficient vector in each of the pixels in the examination image. The relative positional relationship between the class numbers is obtained from the relative positional relationship normal structure database 170, thereby obtaining the structural matching degree of the focus pixel of the examination image. Since the relative positional relationship of each of the classes (the probability that the classes are adjacent to each other) calculated from the normal image is stored in the relative positional relationship normal structure database 170, the structural matching degree of the focus pixel in the examination image to the normal image is higher as the value in the database is larger. According to the exemplary embodiment, as the relative relationship, the relationship (structural matching degree) between the focus pixel and the pixels in 8 surrounding masses, respectively from the relative positional relationship normal structure database. As the final matching degree, the average value or the maximum value of the structural matching degree of each of the 8 surrounding masses is employed.

In Step S25, the lesion determining unit 180 performs lesion determination based on the distance from the nearest neighbor vector obtained in Step S23, and the structural relationship between the local feature quantities obtained in Step S24. According to the exemplary embodiment, the lesion determination is performed using two determination criteria; that is, the local feature quantity and the structural matching degree.

For the lesion determination based on the local features, the distance between the examination image base coefficient vector and the local feature normal structure vector obtained in Step S23 is used. When the distance is greater than or equal to the first threshold, the local feature quantity of the focus pixel is the feature which does not appear in the normal image, and thus it is possible to determine the focus pixel as the lesion site.

The threshold for determining the presence or absence of a lesion is calculated from previous cases, and stored in the lesion determination threshold database 190.

FIG. 15 is a diagram illustrating an example of obtaining a determination threshold for determining the presence or absence of a lesion. A large number of lesion images each containing a lesion site confirmed by a doctor are obtained from previous cases, and the position of the lesion site is supervised in advance. In other words, the position of the lesion site is specified in advance. Next, the image feature quantity calculating unit 110 calculates, for each pixel, a lesion image feature quantity vector which has shift-invariant feature quantities, as elements of a vector. At this time, the image feature quantity calculating unit 110 calculates the lesion image feature quantity vector by dividing the lesion image into a lesion site and a normal portion, and obtains (i) a lesion site image feature quantity vector fd from the lesion site and (ii) a normal portion image feature quantity vector fn from the normal portion.

The lesion site image feature quantity vector fd and the normal portion image feature quantity vector fn are assigned to the vector fp of Expression 6 by the base representing unit 120, and transformed respectively to a lesion site base coefficient vector ad and a normal portion base coefficient vector an.

Next, the nearest neighbor vector obtaining unit 140 searches for a normal image base coefficient vector a which is closest to each of the lesion site base coefficient vectors ad and the normal portion base coefficient vectors an, and obtains the respective distances.

Through the processes described above, the distance in the normal portion and the distance in the abnormal portion are respectively calculated. The first threshold is determined which most effectively separates the lesion site from a normal portion when lesion determination is performed based on the threshold, by using the information.

In the evaluation of the structural matching degree, the lesion determining unit 180 performs lesion determination based on the structural matching degree obtained in Step S24. As with the case of the local feature quantity, the second threshold which is the lesion determination threshold is obtained in advance, and the lesion determination is carried out by threshold processing. By determining the structural matching degree in addition to the lesion determination according to the local feature quantity, it is possible to determine the structural matching degree which cannot be determined only with the local feature quantity, such as that illustrated in FIG. 10.

In Step S26, the output unit 200 outputs the result of determination of the lesion site obtained in Step S25. For example, the output unit 200, when it is determined that there is a lesion site, replaces a pixel value of the lesion site with a pixel value of a specific color, and displays the presence of the lesion site and the position thereof as an image.

Through the processes as described above, lesion detection is made possible without requiring position adjustment between images, by employing the shift-invariant local image feature quantity. Furthermore, lesion detection is made possible which can determine as structurally being normal or abnormal which cannot be determined only by the local feature quantity, by employing the relative positional relationship between the local feature quantities as a structure.

According to the exemplary embodiment, the shift-invariant feature quantity calculated from a normal image and the shift-invariant feature quantity calculated from an examination image are represented by the same base vectors. This eliminates the necessity of setting a landmark for position adjustment between the normal image and the examination image. In addition, a pixel is selected using the matching degree between (i) the relative positional relationship of classes obtained from the result of clustering the shift-invariant feature quantity of an examination image and (ii) the relative positional relationship of classes obtained from the result of clustering the shift-invariant feature quantity of a normal image. Thus, by employing a relative positional relation between local image feature quantities, as knowledge, it is possible to detect a lesion more accurately, taking into consideration the structure of human body that cannot be represented only by a local feature.

More specifically, the examination image and the normal image are compared between the base coefficient vectors, using the shift-invariant feature quantity. For that reason, it is possible to determine the presence or absence of a lesion without performing the position adjustment between the normal image and the examination image. Since the position adjustment processing is not required, there is no decrease in the determination accuracy of a lesion site caused by the difference in a setting method of a landmark or variation in a setting position, and thus it is possible to provide an image processing apparatus with high accuracy in determining a lesion site. Furthermore, a pixel, on an examination image, of which the structural matching degree indicating the relative positional relationship of classes in the normal image is lower than or equal to the second threshold is selected. For that reason, it is possible to select a pixel, on the examination image, which has a structure different from a structure of the normal image. Thus, it is possible to detect a lesion more accurately, taking into consideration the structure of human body which cannot be represented only by a local feature.

In addition, by employing, as a matching degree, the appearance probability of classes of pixels located to be in a predetermined positional relationship in the normal image, detection as a lesion site is made possible when a combination of classes which does not often appear in the normal image appears on the examination image.

It is to be noted that, each of the structural elements in the above-described exemplary embodiment may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, software that accomplishes the image coding apparatus according to each of the above-described embodiments is a program as below.

More specifically, the program causes a computer to execute obtaining an examination image which is an image of an examination subject; calculating, for each pixel, a shift-invariant feature quantity which is represented by predetermined base vectors, from the examination image obtained; selecting, on the examination image, a pixel having a matching degree lower than or equal to a predetermined threshold, between (i) a relative positional relationship of classes in a plurality of normal images each of which does not include a lesion site and (ii) a relative positional relationship of the classes to which a plurality of shift-invariant feature quantities respectively belong in the examination image, the classes being obtained by clustering the plurality of shift-invariant feature quantities which are: calculated from a plurality of pixels included in the normal images; and represented by the predetermined base vectors; and outputting a result of the selection.

Although only some exemplary embodiments have been described in detail above, those skilled in the art will readily appreciate that various modifications may be made in these exemplary embodiments without materially departing from the principles and spirit of the inventive concept, the scope of which is defined in the appended Claims and their equivalents.

One or more exemplary embodiments of the present disclosure are applicable in an image processing apparatus and the like for identifying a lesion site from a medical image.

The invention claimed is:

1. An image processing apparatus comprising:
a non-transitory memory storing a program; and
a hardware processor that executes the program, the program causing the image processing apparatus to operate as:
an examination image obtaining unit configured to obtain an examination image which is an image of an examination subject;
a shift-invariant feature quantity calculating unit configured to calculate, for each pixel, a shift-invariant feature quantity which is represented by predetermined base vectors, from the examination image obtained by the examination image obtaining unit;
a selecting unit configured to select, on the examination image, a pixel of which (i) a distance between an examination image base coefficient vector and a local feature normal structure vector is greater than or equal to a first threshold or (ii) a matching degree is lower than or equal to a predetermined threshold, between (i) a relative positional relationship of classes in a plurality of normal images each of which does not include a lesion site and (ii) a relative positional relationship of the classes to which a plurality of shift-invariant feature quantities respectively belong in the examination image, the classes being obtained by clustering the plurality of shift-invariant feature quantities which are: calculated from a plurality of pixels included in the normal images; and represented by base vectors identical to the predetermined base vectors; and
an output unit configured to output a result of the selection performed by the selecting unit.

2. The image processing apparatus according to claim 1, wherein the shift-invariant feature quantity calculating unit includes:

an image feature quantity calculating unit configured to calculate, for each pixel, an examination image feature quantity vector which has a plurality of the shift-invariant feature quantities as elements of a vector, from the examination image obtained by the examination image obtaining unit; and a base representing unit configured to calculate, for each pixel of the examination image, (i) coefficients used to represent the examination image feature quantity vector in a linear combination of normal image base vectors which are: base vectors of a plurality of normal image feature quantity vectors each of which is calculated from the pixels included in the normal images; and base vectors of the normal image feature quantity vectors each having the shift-invariant feature quantities as the elements of a vector, and (ii) an examination image base coefficient vector having the calculated coefficients as the elements of the vector, the selecting unit includes:

a nearest neighbor vector obtaining unit configured to (i) obtain, for the each pixel of the examination image, a local feature normal structure vector which is most similar to an examination image base coefficient vector from a local feature normal structure database, and (ii) obtain: a class number of a class to which the obtained local feature normal structure vector belongs; and a distance between the examination image base coefficient vector and the obtained local feature normal structure vector, the local feature normal structure database storing, for each of classes obtained by clustering a plurality of normal image base coefficient vectors, the local feature normal structure vector which is a center vector representing at least one normal image base coefficient vector that belongs to the class, together with a class number of the class, the plurality of the normal image base coefficient vectors being obtained from the normal image feature quantity vectors and each having, as elements, coefficients used to represent the normal image feature quantity vector in the linear combination of the normal image base vectors;

a relative positional relationship obtaining unit configured to obtain a structural matching degree of the each pixel of the examination image, using the class number obtained by the nearest neighbor vector obtaining unit, from a relative positional relationship normal structure database which stores, as the structural matching degree, a relative positional relationship of the classes in the normal images, the relative positional relationship being obtained from class numbers resulting from clustering performed on the normal image feature quantity vectors; and a pixel selecting unit configured to select, on the examination image, a pixel of which (i) the distance obtained by the nearest neighbor vector obtaining unit is greater than or equal to a first threshold or (ii) the structural matching degree obtained by the relative positional relationship obtaining unit is smaller than or equal to a second threshold, and the output unit is configured to output a result of the selection performed by the selecting unit.

3. The image processing apparatus according to claim 2, wherein the pixel selecting unit includes a lesion determining unit configured to determine, on the examination image, a pixel of which (i) the distance obtained by the nearest neighbor vector obtaining unit is greater than or equal to a first threshold or (ii) the structural matching degree obtained by the relative positional relationship obtaining unit is smaller than or equal to a second threshold, as a pixel of a lesion site, and the output unit is configured to output a result of the determination performed by the lesion determining unit.

4. The image processing apparatus according to claim 2, wherein the relative positional relationship normal structure database stores an appearance probability of classes of pixels located to be in a predetermined positional relationship, as the structural matching degree, and the relative positional relationship obtaining unit is configured to (i) identify classes of the pixels located to be in the predetermined positional relationship in the examination image, using the class number obtained by the nearest neighbor vector obtaining unit, and (ii) obtain the appearance probability of the classes of the pixels located to be in the predetermined positional relationship from the relative positional relationship normal structure database, to obtain the structural matching degree of each of the pixels included in the examination image.

5. The image processing apparatus according to claim 2, wherein the relative positional relationship normal structure database stores, as a structural matching degree, an appearance probability of classes of pixels aligned in a predetermined direction and having different class numbers, and the relative positional relationship obtaining unit is configured to obtain, from the relative positional relationship normal structure database, the appearance probability of the classes of pixels aligned in the predetermined direction and having the different class numbers in the examination image, using the class number obtained by the nearest neighbor vector obtaining unit, to obtain a structural matching degree of each of the pixels included in the examination image.

6. An image processing apparatus comprising:

a non-transitory memory storing a program; and a hardware processor that executes the program, the program causing the image processing apparatus to operate as:

a normal image obtaining unit configured to obtain a plurality of normal images which are images including no lesion;

an image feature quantity calculating unit configured to calculate, for each pixel, a normal image feature quantity vector which has a plurality of shift-invariant feature quantities as elements of a vector, from each of the normal images obtained by the normal image obtaining unit;

a principal component analysis unit configured to perform principal component analysis on the normal image feature quantity vectors calculated, by the image feature quantity calculating unit, from pixels included in the normal images to obtain (i) normal image base vectors which are base vectors of the normal image feature quantity vectors and (ii) a plurality of normal image base coefficient vectors resulting from base conversion performed on the normal image feature quantity vectors using the normal image base vectors;

a base vector output unit configured to write, on a base vector storage, the normal image base vector obtained by the principal component analysis unit;

a clustering unit configured to perform clustering on the normal image base coefficient vectors to obtain, for each class, a center vector which represents at least one of the normal image base coefficient vectors which belong to the class;

a center vector output unit configured to write, on a local feature normal structure database, the center vector obtained by the clustering unit, together with a class number of a class represented by the center vector;

a relative positional relationship calculating unit configured to calculate, as a structural matching degree, a relative positional relationship of classes in the normal images, the relative positional relationship being obtained from the class number;

a relative positional relationship output unit configured to write, as the structural matching degree, a relative positional relationship calculated by the relative positional relationship calculating unit, between classes in the normal images, on a relative positional relationship normal structure database; and a selecting unit configured to select, on the examination image, a pixel of which (i) a distance between an examination image base coefficient vector and a local feature normal structure vector is greater than or equal to a first threshold or (ii) the structural matching degree obtained by the relative positional relationship calculating unit is smaller than or equal to a second threshold.

7. The image processing apparatus according to claim 1, wherein the shift-invariant feature quantity includes a wavelet coefficient, a higher order local autocorrelation (HLAC) feature quantity, a scale-invariant feature transform (SIFT) feature quantity, or a histogram of oriented gradients (HOG) feature quantity.

8. The image processing apparatus according to claim 1, wherein the image is one of a radiological image, an ultrasound image, and a pathological specimen image.

9. An image processing method comprising:
obtaining an examination image which is an image of an examination subject;
calculating, for each pixel, a shift-invariant feature quantity which is represented by predetermined base vectors, from the examination image obtained;
selecting, on the examination image, a pixel of which (i) a distance between an examination image base coefficient vector and a local feature normal structure vector is greater than or equal to a first threshold or (ii) a matching degree is lower than or equal to a predetermined threshold, between (i) a relative positional relationship of classes in a plurality of normal images each of which does not include a lesion site and (ii) a relative positional relationship of the classes to which a plurality of shift-invariant feature quantities respectively belong in the examination image, the classes being obtained by clustering the plurality of shift-invariant feature quantities which are: calculated from a plurality of pixels included in the normal images; and represented by base vectors identical to the predetermined base vectors; and
outputting a result of the selection.

10. A non-transitory computer-readable recording medium having a computer program recorded thereon for causing the computer to execute the image processing method according to claim 9.

* * * * *